(12) United States Patent
Hoff et al.

(10) Patent No.: US 6,577,976 B1
(45) Date of Patent: Jun. 10, 2003

(54) METHOD FOR DYNAMIC AUTOCALIBRATION OF A MULTI-SENSOR TRACKING SYSTEM AND APPARATUS INCORPORATING IT THEREIN

(75) Inventors: Bruce Hoff, Malibu, CA (US); Ronald T. Azuma, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 09/397,899

(22) Filed: Sep. 17, 1999

(51) Int. Cl.[7] .............................................. G01C 17/38
(52) U.S. Cl. ........................ 702/95; 702/94; 702/150; 33/356; 73/1.76; 324/246
(58) Field of Search .............................. 702/95, 94, 93, 702/150, 85, 86, 92; 701/221, 200; 33/356, 361, 352; 324/246, 245, 225; 73/1.76, 178 R

(56) References Cited

U.S. PATENT DOCUMENTS

| | | |
|---|---|---|
| 4,031,630 A | 6/1977 | Fowler |
| 4,091,543 A | 5/1978 | Lapeyre |
| 4,143,467 A | 3/1979 | Erspamer |
| 4,327,498 A | 5/1982 | Setter et al. |
| 4,347,730 A | 9/1982 | Fisher et al. |
| 4,414,753 A | 11/1983 | Moulin et al. |
| 4,660,161 A | 4/1987 | Okada |
| 4,698,912 A | 10/1987 | Fowler et al. |
| 4,953,305 A | 9/1990 | Van Lente et al. |
| 5,046,031 A | 9/1991 | Wanous |
| 5,165,269 A | 11/1992 | Nguyen |
| 5,187,872 A | 2/1993 | Dufour |
| 5,235,514 A | 8/1993 | Matsuzak |
| 5,390,122 A | 2/1995 | Michaels |
| 5,645,077 A * | 7/1997 | Foxlin .......................... 600/587 |
| 5,802,727 A | 9/1998 | Blank |
| 6,108,593 A * | 8/2000 | Didinsky et al. ............ 244/165 |

OTHER PUBLICATIONS

Foxlin, "Inertial Head—Tracker Sensor Fusion by Complimentary Separate Bias Kalman Filter," Proc. VRAiS 1996, pp. 185–193.*

Borse, G. J., Numerical Methods With MATLAB: A Resource for Scientists and Engineers, 1997, PWS Publishing Company, pp. 344–345.*

* cited by examiner

Primary Examiner—John Barlow
Assistant Examiner—Hien Vo
(74) Attorney, Agent, or Firm—Tope-McKay & Associates

(57) ABSTRACT

A method for dynamic auto-calibration of a multi-sensor tracking system and apparatus incorporating it therein are presented. The method and apparatus utilize information from complementary sensors, filtered by a simultaneously running filter that combines the sensor data into an estimate of the state of the monitored system to iteratively tune the bias estimate. To track a dynamic system, complimentary or redundant sensors may be combined with a model of the system so that the uncertainty in the estimated state of the dynamic system is less than the noise in the individual sensors. In addition to noise, the sensors may have bias, which has the same value whenever the system is in a particular state. While estimating the actual value of the state, the present invention allows the estimator to determine the bias. The present invention, in its most general embodiment requires complex computations. However, significant simplifications have also been developed, which reduce the necessary computational power to a manageable level. The present invention has been reduced to practice in the context of a head-tracking system employing a plurality of sensors to determine the orientation of a human head.

28 Claims, 8 Drawing Sheets

| Data Set | RMS Discrepancy Before Tuning | RMS Discrepancy After Tuning |
|---|---|---|
| 1 | 4.3 degrees | 0.97 degrees |
| 2 | 4.9 degrees | 0.82 degrees |
| 3 | 4.4 degrees | 0.96 degrees |

FIG. 6

METHOD FOR DYNAMIC AUTOCALIBRATION OF A MULTI-SENSOR TRACKING SYSTEM AND APPARATUS INCORPORATING IT THEREIN

TECHNICAL FIELD

This invention relates to the calibration of real-time multi-sensor tracking systems. More particularly, the invention relates to systems that use information from complimentary sensors, filtered by a simultaneously running filter component, to calibrate sensor bias and to iteratively tune the bias estimate.

BACKGROUND OF THE INVENTION

Magnetic compasses are subject to several outside influences that produce errors in the compass reading. One of these error sources is magnetic variation, which is the difference between the direction of the field lines of the earth's magnetic field and true north at any particular point on the earth, and which is a function of geographic position. Another source of error is magnetic deviation, which is the difference between magnetic north and the actual compass reading caused by local magnetic perturbations due to concentrations of metal or other magnetically active substances. Magnetic deviation is typically strong near large metal structures such as bridges, buildings with large steel components, and ships, or near structures that transport electricity such as power stations and electrical cables. Furthermore, in the case of ships or other large movable metal objects, the magnetic deviation may vary not only with direction, but may also vary over time in a particular direction.

Magnetic variation and static forms of magnetic deviation may be corrected in large part by modeling over the geographic region in question. Current approaches to bias determination rely either on a model of the bias, or on a number of external references and an involved calibration procedure. In the model-based approach, a mathematical model of how ambient magnetic fields modify compass output is used, and the calibration procedure uses a small number of external references to determine the parameters of the model. The heart of this method is the determination of a magnetic bias field that is fixed with respect to the compass, and thus moving with respect to the earth's magnetic field. It involves superimposing and subtracting the mapped magnetic bias field to leave only the earth's magnetic field in order to provide accurate compass output. Unfortunately, this approach has the disadvantage of being model-based, i.e. the bias must follow a general shape, which may not always be applicable to the measured bias. In the external reference approach, a large number of external references (e.g. landmarks at known headings) are used to build a distortion map. In this approach, known heading directions are used to calibrate the compass by comparing the compass reading with a known heading and subtracting the bias for that known heading to generate pure heading information. This approach requires many calibration points and a cumbersome, explicit calibration procedure. As a variation on this approach, prior art has also taught the use of a directional gyroscope to provide a second heading indicator to be compared with the compass heading to yield bias correction. This variation has the advantage of eliminating the need for predetermined, stored directions but is disadvantageous because the drift in the directional gyroscope causes it to become inaccurate over time. Existing systems utilizing this approach require an explicit calibration procedure, and drift out of calibration when the sensor distortion changes unless the calibration procedure is rerun. Thus, in the case of a ship, for example, although a mapped calibration procedure may be successful for a given ship configuration, any change in the structure of the ship or its contents may result in a need for re-calibration.

SUMMARY OF THE PRESENT INVENTION

A method for dynamic autocalibration of a multi-sensor tracking system, having a system state $x_i$ within a state space, including the steps of: dividing the state space into a plurality of patches $p_j$; providing a variable bias map including a plurality of bias entries $\hat{B}_j$ with each particular one of the plurality of bias entries $\hat{B}_j$ associated with a particular one of the plurality of patches $p_j$; providing a vector $z_i$ of inputs from a plurality of sensors for a given time step i; determining the patch $p_j$ to which the vector $z_i$ from the plurality of sensors applies; combining the vector $z_i$ with the bias entry $\hat{B}_j$ corresponding to the patch $p_j$ to which the input $z_i$ from the plurality of sensors applies to provide a bias adjusted sensor input; providing a state estimator to receive the bias adjusted sensor input and to produce a system state estimation $\hat{x}_i$ corresponding to the time step i; using a combination of the bias adjusted sensor input and the system state estimation $\hat{x}_i$ to adjust the bias entry $\hat{B}_j$ of the variable bias map corresponding to the patch $p_j$ to which the input $z_i$ from the plurality of sensors applies; and repeating a portion of the steps to provide a continual system update. In the case where the bias map includes a constant bias offset, the method further includes, the steps of: obtaining a calibration bias pair including an externally specified calibration bias $\hat{B}^*$ and a corresponding system state calibration value $x^*$; and applying the calibration bias pair to the variable bias map to eliminate the constant bias offset. The error minimization utilized in the present invention may be chosen as desired for a particular application, but is preferably performed by means of gradient descent utilizing a learning rate $\gamma'$ and the combination of the bias adjusted sensor input and the system state estimate $\hat{x}_i$.

In addition to the use of a look-up table type bias map, the bias map may also be represented in the form of a parametric equation. An example of this type of bias map is provided through the use of Gaussian fuzzy sets, and is represented in a preferred embodiment including at least one gyroscope, at least one compass, and at least one tilt sensor incorporated as part of a head-mounted orientation tracker.

BRIEF DESCRIPTION OF THE DRAWINGS

FIG. 6 presents results from a head-tracking embodiment in the form of a table displaying the root-mean-squared discrepancy between the sensed and estimated heading for three data sets, before and after the bias-estimation method is applied;

DETAILED DESCRIPTION

Figure 1:
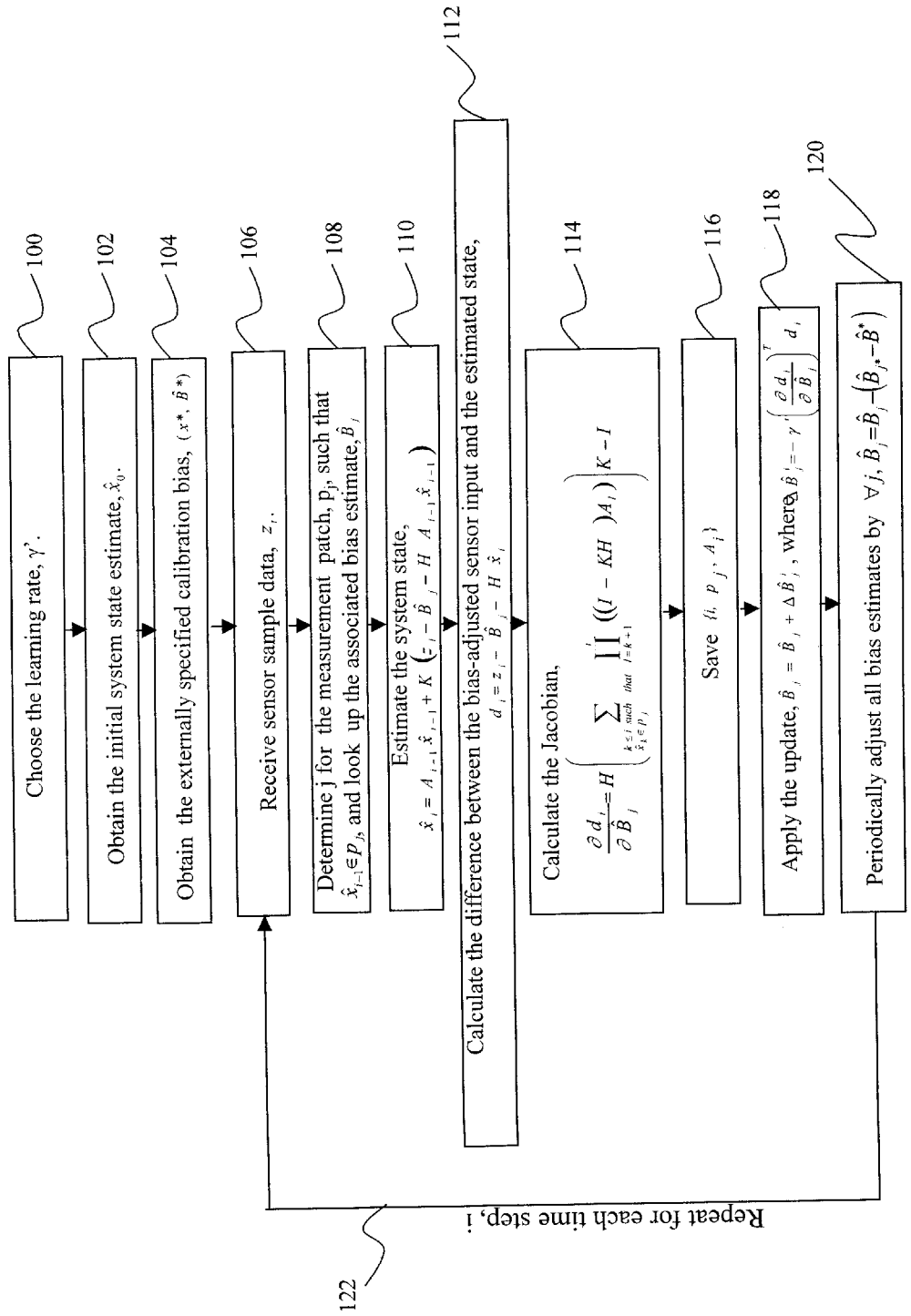
FIG. 1 is a flowchart presenting the steps of the present invention in a general embodiment, which utilizes gradient descent as the procedure used in the error minimizer.

The present invention relates to a method for using information from complementary sensors to calibrate sensor bias, and apparatus incorporating it therein. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not intended to be limited to the embodiments shown, but is to be accorded the widest scope consistent with the principles and novel features disclosed herein.

In order to provide sensor bias calibration, the present invention utilizes information from a simultaneously running filter that combines sensor data into an estimation of the state of the monitored system in order to iteratively tune the bias estimate. To track a dynamic system, complementary, or redundant, sensors may be combined with a model of the system so that the uncertainty in the estimated state of the dynamic system is less than the noise in the individual sensors. In addition to noise, sensors may have bias, i.e. they may produce errors that vary with the system's state but that are repeatable (having the same value whenever the system is in a particular state). While estimating the actual value of the state, the present invention uses an estimator to determine the bias.

The primary application of the present invention to date is in head-mounted orientation tracking systems, which use a compass, a tilt sensor, and gyroscopes to track movement of the head and to estimate its orientation at any time. The particular system to which the present invention has been applied involves what has been termed "augmented reality." Specifically, the system includes an information overlay for the natural environment, which provides visual cues regarding various landmarks and other environmental details. In order to provide cues in a meaningful manner, the system must track both the location of the user and the orientation of their head in terms of roll, pitch, and heading. The orientation of the user's head is tracked by inertial navigation combined with the absolute orientation provided by a compass and tilt sensor. The compasses utilized in the trackers are known to have orientation-specific distortions due to ambient magnetic fields. An advantage of utilizing the present auto-calibration method lies in its ability to allow the combined use of the gyroscopes and the compass to automatically map out the distortion in real-time. By utilizing sensor redundancy to perform the calibration, rather than standard modeling procedures, use of only one external landmark at a known heading is required. Thus, the present invention makes no "model-based" assumptions regarding the shape of the distortion map, which is especially important because distortion maps often obey no predictable pattern. This unpredictability is especially problematic when there is a need for a high degree of accuracy. Further, because the bias-determination process runs concurrently with the state estimator, changes in the distortion map are constantly monitored and corrected. Since existing systems require an explicit calibration procedure, they drift out of calibration in response to unpredictable sensor distortion changes unless the calibration procedure is rerun.

In the problem of estimating the unbiased state, the system herein may be mathematically modeled as a discrete time dynamic system that is subject to perturbing noise. Furthermore, the sensors that track the state of the system are inherently noisy. Using a combination of a model of the system and the sensor data, an estimate of the state of the system at any time may be calculated. The resulting estimate provides more accurate results than either the model or the sensors alone. Additionally, it is desirable to solve a parameter estimation problem. Specifically, the sensors have inherent biases that vary with the system state, but that are also repeatable. As mentioned previously, this means that each time the system passes through a specific state, the biases are the same. This is in contrast to the sensor and process noise, may vary even within the same specific state.

The system state at a particular time step i is represented by $x_i$, evolves according to linear state dynamics as follows:

$$x_{i+1} = A_i x_i + w_i \tag{1}$$

where $x_{i+1}$ represents the next system state (i.e. the system state at time step i+1), $A_i$ represents a state transition matrix, and $w_i$ is a noise source, where $\overline{w}_i = 0$. Higher order non-linear terms, including driving inputs, are modeled as noise, and are also included in $w_i$.

A sensor measures the system state $x_i$, producing output in the form of a vector $z_i$ of inputs from the plurality of sensors. The dependence of the vector $z_i$ on the system state $x_i$ is given by:

$$z_i = H x_i + B(x_i) + v_i \tag{2}$$

where $v_i$ is a noise source, where $\overline{v}_i = 0$, H is a constant matrix for mapping state values onto the system state $x_i$, and $B(x_i)$ is the state dependent sensor bias.

The estimation process is subject both to process noise (which makes open loop modeling inaccurate) and to sensor noise and bias (which make sensing of the state inaccurate). The estimation approach combines the next system state estimation $x_{i+1}$ based on the system dynamics as set forth in Equation (1) above, and the vector $z_i$ from the sensors as set forth in Equation (2) above, resulting in:

$$\hat{x}_{i+1} = A_i \hat{x}_i + K(z_{i+1} - \hat{B}(A_i \hat{x}_i) - H A_i \hat{x}_i) \tag{3}$$

where $\hat{B}(A_i \hat{x}_i)$ is the estimate of the sensor bias. Two elements are combined to give the updated next state estimate, $\hat{x}_{i+1}$ as follows: A prior estimate from time step i, $\hat{x}_i$, is applied to the state transition matrix $A_i$ to give the next system state estimate $\hat{x}_{i+1}$. This is modified by a correction term, $z_{i+1} - \hat{B}(A_i \hat{x}_i) - H A_i \hat{x}_i$, which represents the difference between what the sensors estimate and what the model predicts. K in the equation represents weight values chosen to add emphasis to either the model or the sensors based on their relative noisiness. The remaining problem is to determine the estimated bias $\hat{B}$. This determination is performed by the system depicted in its generic form in FIG. 1 and 2, as discussed below.

Before system operation, the state space is divided into a plurality n measurement regions, or patches $p_1 \rightarrow p_n$, each of which has a single associated bias estimate. That is, when the estimated system state is in the measurement patch $p_j$, the bias estimate $\hat{B}_j$ is applied. In other words, $\hat{B}(A_i \hat{x}_i) = \hat{B}_j$, if $A_i \hat{x}_i \in p_j$. In this case, the bias estimates $\hat{B}_j$ are specific to their associated patches $p_j$ so they may be stored in the form of a look-up table.

Next, the quantity $E[z_i - Hx_i | x_i]$, representing the difference between the sensed and true values for a state, is computed. Substituting Equation (2) for the vector $z_i$ to determine this quantity, the following operation is performed:

$$E[z_i - Hx_i | x_i] = E[B(x_i) + v_i | x_i] = B(x_i) + \bar{v}_i = B(x_i). \tag{4}$$

This follows from the fact that the state-dependent sensor bias $B(x_i)$ is constant for each system state $x_i$, and $\bar{v}=0$. By collecting statistics on this difference, the state dependent bias could be computed and used to adjust the sensor output. The problem would be feasible if the actual system state, $x_i$, were known. However, there is no direct access to this information and an indirect estimation method must be employed. Another way to cast the problem is to subtract a sensor bias estimate, then tune it so the expected value is zero. In other words, $$E[z_i - \hat{B}(x_i) - Hx_i | x_i] = 0,$$

where $\hat{B}(x_i)$ is a good estimate of the sensor bias. This could be done for each patch $p_j$, by searching for an estimated bias, $\hat{B}_j$, where $$E[z_i - \hat{B}_j - Hx_i | x_i \in p_j] = 0.$$

In order to determine the bias, various error minimization algorithms may be utilized. One particular method, gradient descent, has been found to be effective for the particular embodiments presented herein. Although gradient descent is presented herein to provide error minimization, various other algorithms may be equally effective depending on the particular application.

Gradient descent provides a straightforward approach to this parameter estimation problem: First, construct a function of the bias estimate $\hat{B}_j$, called an energy function, which is everywhere nonnegative, and is a minimum where the bias estimate $\hat{B}_j$ is optimal. Then take the gradient of this function with respect to the bias estimate $\hat{B}_j$ and incrementally change the bias estimate $\hat{B}_j$ to reduce the value of the energy function in search of an optimum.

An example of an energy function useful for an embodiment of the invention is provided by $E_j$, which represents the statistical variance of $d_i$ over all "visits" the system makes to particular patch $p_j$:

$$E_j = \frac{1}{2} \frac{1}{|p_j|} \sum_{\hat{x}_i \in p_j} d_i^T d_i, \tag{5}$$

where $$d_i = z_i - \hat{B}_j - H\hat{x}_i \tag{6}$$

where $|p_j|$ is the number of "visits" the system makes to particular patch $p_j$, and the "½" is an arbitrary positive constant added for convenience.

The gradient descent algorithm is expressed by the parameter update rule:

$$\Delta \hat{B}_j = -\gamma (\nabla_{\hat{B}_j} E_j)^T \tag{7}$$

where $\Delta \hat{B}_j$ is the change to the sensor bias estimate $\hat{B}_j$ for a particular patch $p_j$, $\gamma$ is a small positive constant controlling the learning rate, and $\nabla_{\hat{B}_j} E_j$ is the gradient of $E_j$ with respect to $\hat{B}_j$. The gradient of Equation (5) is determined with respect to $\hat{B}_j$ $$\nabla_{\hat{B}_j} E_j = \frac{1}{|p_j|} \sum_{\hat{x}_i \in p_j} \left( \frac{\partial d_i}{\partial \hat{B}_j} \right)^T d_i, \text{ where} \tag{8}$$

$$\frac{\partial d_i}{\partial \hat{B}_j} = H \left( \sum_{\substack{k \leq i \text{ s.t.} \\ x_k \in p_j}} \prod_{l=k}^{i-1} (I - KH) A_i \right) K - I$$

where s.t. is an abbreviation for "such that", l is an indexing variable, I represents the identity matrix, and K, $A_i$, and H are as previously defined relative to Equations (3), (1), and (2), respectively.

Since the energy function, Equation (8) is a sum; the incremental bias change $\Delta \hat{B}_j$ can be modeled as a sequence of changes, one for each visit to a particular patch $p_j$, i.e.

$$\Delta \hat{B}_j = \sum_{\hat{x}_i \in p_j} \Delta \hat{B}_j^i,$$

$$\Delta \hat{B}_j^i = -\gamma' \left( \frac{\partial d_i}{\partial \hat{B}_j} \right)^T d_i^T, \text{ and}$$

$$\gamma' = \frac{1}{|p_j|} \gamma.$$

FIG. 1 provides a flow chart that summarizes the bias estimating procedure. As shown in the figure, it is first necessary to set a learning rate $\gamma'$ for the system, represented by box 100. Next, an initial system state estimate $\hat{x}_0$ is obtained as represented by 102. Next, an externally specified calibration bias $(x^*, \hat{B}^*)$ (e.g. a known landmark at a known heading in the case of a head-mounted orientation tracking system) is obtained, as represented by 104. The remaining boxes of FIG. 1 demonstrate the routine that is performed for each time step i during the operation of the system. The arrow 122 indicates repeated performance of this routine. Sensor sample data in the form of a vector $z_i$ is first received in the system from a plurality of sensors 106. After receiving the sensor sample data vector $z_i$ it is necessary to determine the current measurement patch $p_j$ such that $x_{i-1} \in p_j$, and to look up the associated bias estimate $\hat{B}_j$ from the bias estimate table as shown by 108. The bias estimate table is preferably designed to perform the patch $p_j$ determination. As shown by box 110, the estimated system state $\hat{x}_i$ is developed through the following equation, $$\hat{x}_i = A_{i-1} \hat{x}_{i-1} + K(z_i - \hat{B}_j - H A_{i-1} \hat{x}_{i-1}).$$

The difference between the bias-adjusted sensor input and the estimated system state are then calculated, as shown by box 112, by the following, $$d_i = z_i - \hat{B}_j - H\hat{x}_i.$$

Next, as represented by box 114, the Jacobian, $$\frac{\partial d_i}{\partial \hat{B}_j} = H\left(\sum_{\substack{k \le i\,\text{s.t.} \\ x_k \in p_j}} \prod_{l=k}^{i-1} (I - KH)A_i\right) K - I,$$

is calculated. For summation via the Jacobian calculation of 114, this procedure requires the retention of past values of the state transition matrix $A_i$ and information regarding the time step i and the patch $p_j$, as represented by box 116. Next, the update, $\hat{B}_j = \hat{B}_j + \Delta\hat{B}^i_j$, is applied to the bias table where, $$\Delta\hat{B}^i_j = -\gamma' d_i^T \frac{\partial d_i}{\partial \hat{B}_j},$$

as represented by box 118. Finally, all bias estimates are periodically refreshed by $\forall j$, $\hat{B}_j = \hat{B}_j - (\hat{B}_{j^*} - \hat{B}^*)$, where $\forall j$ is used as a convention for "for all j", $\hat{B}_{j^*}$ represents the estimated calibration bias applied to the particular patch $p_j$, and $\hat{B}^*$ represents the bias provided by the external calibration bias$(x^*, \hat{B}^*)$ to subtract the constant bias error from the entire bias map, as shown by 120. Finally, the externally specified calibration bias $(x^*, \hat{B}^*)$ is obtained and applied to the bias table, as represented by box 120. After the externally specified calibration bias $(x^*, \hat{B}^*)$ has been applied to the bias table, the routine begins again with the receipt of a new sensor sample data vector $z_i$ 104, as represented by the arrow 122 between box 120 and 104.

Figure 2:
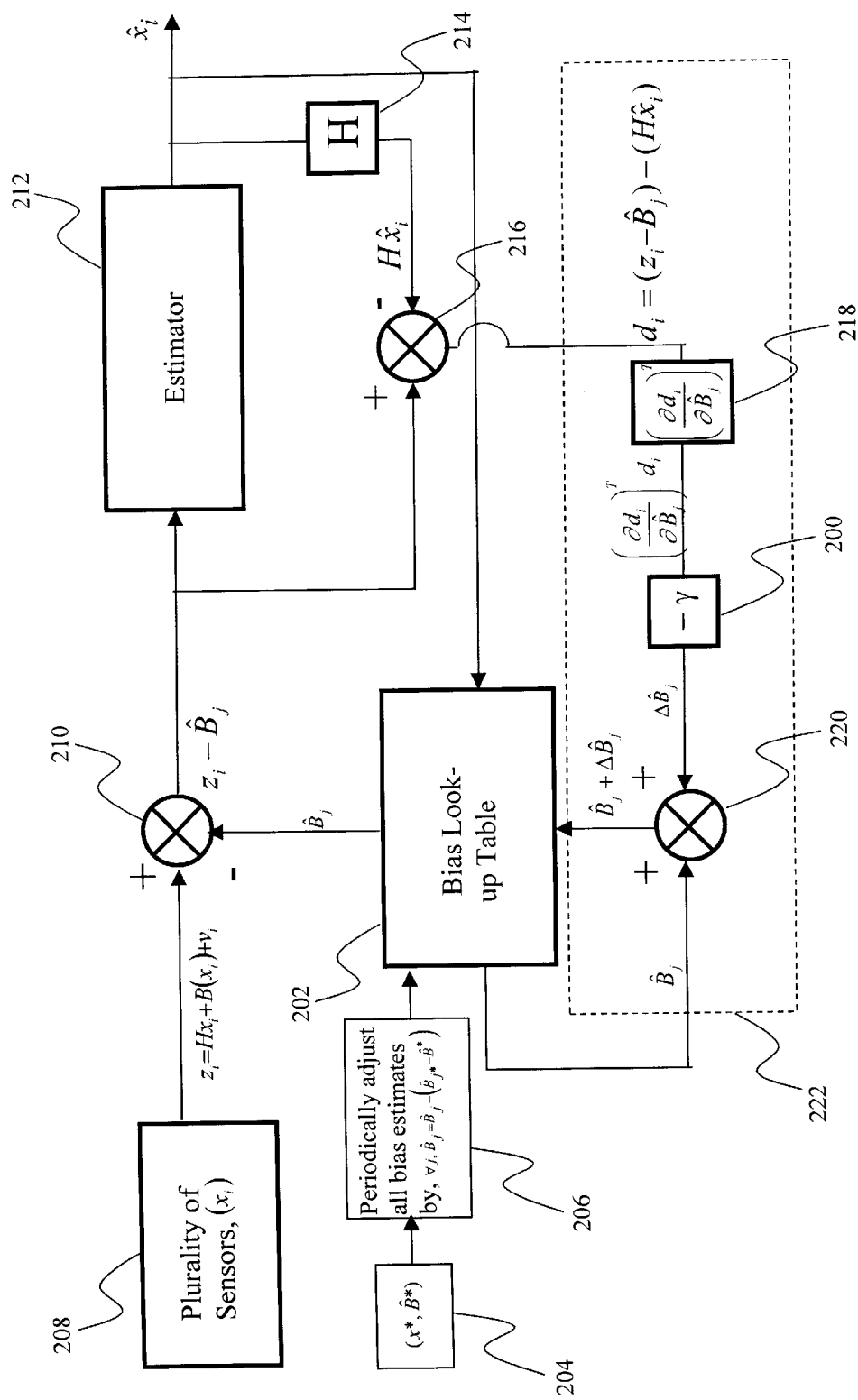
FIG. 2 is a block diagram demonstrating the operation of the present invention in a general embodiment, which utilizes gradient descent as the function used in the error minimizer.

FIG. 2 provides an overview of the dynamic auto-calibration estimated bias determination method of the present invention in the form of a block diagram. Prior to operation of the system, a learning rate $\gamma'$ is set and is represented by block 200. A bias table 202 is maintained, which is indexed by the estimated system state $\hat{x}_i$ and whose output is the estimated bias $\hat{B}_j$. A single external input that provides the bias for one state, $x^*$, is needed to offset the bias table in order to allow for calibration. Thus, an externally specified calibration bias $(x^*, \hat{B}^*)$ 204 including a sensor value reference, $x^*$, and an externally specified calibration bias $\hat{B}^*$ are provided. Furthermore, all bias estimates are periodically adjusted by $\forall j$, $\hat{B}_j = \hat{B}j - (\hat{B}_{j^*} - \hat{B}^*)$, as represented by 206, which incorporates the externally specified calibration bias $\hat{B}^*$. Biased input from a plurality of sensors 208 is aggregated in the form of a vector, $z_i = Hx_i + B(x_i) + v_i$, where $x_i$ is a vector representation of the system state at time step i; H is a constant matrix for mapping state values onto sensor values; B is the state dependent sensor bias; and $v_i$ represents unbiased sensor noise. The estimated bias $\hat{B}_j$ for a given estimated state, is subtracted from the biased sensor reading vector $z_i$ by a first comparator 210, to provide a bias-adjusted sensor reading $z_i - \hat{B}_j$. The bias-adjusted sensor reading $z_i - \hat{B}_j$ is provided to an estimator 212, which then generates a system state estimate vector $\hat{x}_i$. The estimator 212 may also include memory to provide for the retention of past values of the state transition matrix $A_i$ and information regarding the time step i and the patch $p_j$, as discussed relative to box 116 of FIG. 1. The system state estimate vector $\hat{x}_i$ is then multiplied through the constant matrix H 214, providing a constant matrix-multiplied estimate $H\hat{x}_i$. The constant matrix-multiplied estimate $H\hat{x}_i$ and the bias-adjusted sensor reading $z_i - \hat{B}_j$ provide inputs to a second comparator 216, with the bias-adjusted sensor input $z_i - \hat{B}_j$ being subtracted from the constant matrix-multiplied estimate $H\hat{x}_i$. The Jacobian of the resulting difference $d_i = (z_i - \hat{B}_j) - (H\hat{x}_i)$ is then calculated 218, and is then multiplied by the learning rate $-\gamma$ 200. The learning rate preferably takes the form of a multiplicative scalar parameter between zero and one to provide a bias estimate adjustment figure $\Delta\hat{B}_j$. An incrementor 220 combines the bias estimate $\hat{B}_j$ generated from the bias table 202 with the bias estimate adjustment figure $\Delta\hat{B}_j$ to provide an adjusted bias estimate $\hat{B}_j + \Delta\hat{B}_j$. The bias table 202 receives the adjusted bias estimate $\hat{B}_j + \Delta\hat{B}_j$ and the estimate of the system state $\hat{x}_i$ in order to provide the next bias estimate $\hat{B}_j$ to the first comparator 208. The change in the bias table can be computed from the difference between the estimated state and the corrected sensor reading. The rate of change is governed by the learning rate. Over time, the sequence of changes to the bias table drives the values it contains toward the correct values. Note that the incrementor 220, the learning rate $-\gamma$ 200, and the Jacobian calculation 218 are all part of what is termed the error minimizer 222 of the present invention. As previously stated, there are many potential error minimization functions that may be employed.

The calculation of the Jacobian can be computationally intensive, as each term in the sum contains a product of a series of matrices. However, a significant simplification may be made. Note that the simplification is not critical to the present invention, but rather, is provided to demonstrate a preferred method by which its operation may be simplified. The mathematical steps in the simplification will be illustrated below in order to provide a clear explanation. As described above, the matrix K is designed to give partial weight to sensor input, with the sensor input as previously described in Equation (3). Similarly, $(I - KH)$ gives partial weight to the model prediction. When these matrices are iteratively multiplied, they decay the terms in which they are contained. This is best illustrated with an example as follows:

First, rewrite Equation (8), $$\frac{\partial d_i}{\partial \hat{B}_j} = H\left(\sum_{\substack{k \le i\,\text{s.t.} \\ x_k \in p_j}} \prod_{l=k}^{i-1} (I - KH)A_i\right) K - I,$$

and, for simplicity set H=I and $A_i$=A. The equation then becomes $$\frac{\partial d_i}{\partial \hat{B}_j} = I\left(\sum_{\substack{k \le i\,\text{s.t.} \\ x_k \in p_j}} (I - IK)^{i-1-k} A^{i-1-k}\right) K - I.$$

Now set K=$\alpha \cdot$I; $0 < \alpha < 1$, and the equation becomes $$\frac{\partial d_i}{\partial \hat{B}_j} = \left(\sum_{\substack{k \le i\,\text{s.t.} \\ x_k \in p_j}} (I - \alpha I)^{i-1-k} A^{i-1-k}\right) \alpha I - I, \text{ or}$$

-continued $$\frac{\partial d_i}{\partial \hat{B}_j} = a \left( \sum_{\substack{k \le i \text{ s.t.} \\ x_k \in P_j}} (I-a)^{i-1-k} A^{i-1-k} \right) - I$$

Clearly, there exist terms in the last equation when k<<i. Since an approximate gradient often allows gradient descent to find an optimum, i.e. by proceeding 'gradually downhill' rather than 'directly downhill', it is sufficient to ignore all the terms that include K, and approximate Equation (8) by $$\frac{\partial d_i}{\partial \hat{B}_j} = -I,$$

which is much simpler computationally. As a result, the whole bias-update algorithm may be written compactly as follows:

$$\Delta \hat{B}_j{}^i = -\gamma'(z_i - \hat{B}_j - H\hat{x}_i)(-I)$$

or $$\Delta \hat{B}_j{}^i = \gamma'(z_i - \hat{B}_j - H\hat{x}_i). \quad (9)$$

Figure 3:
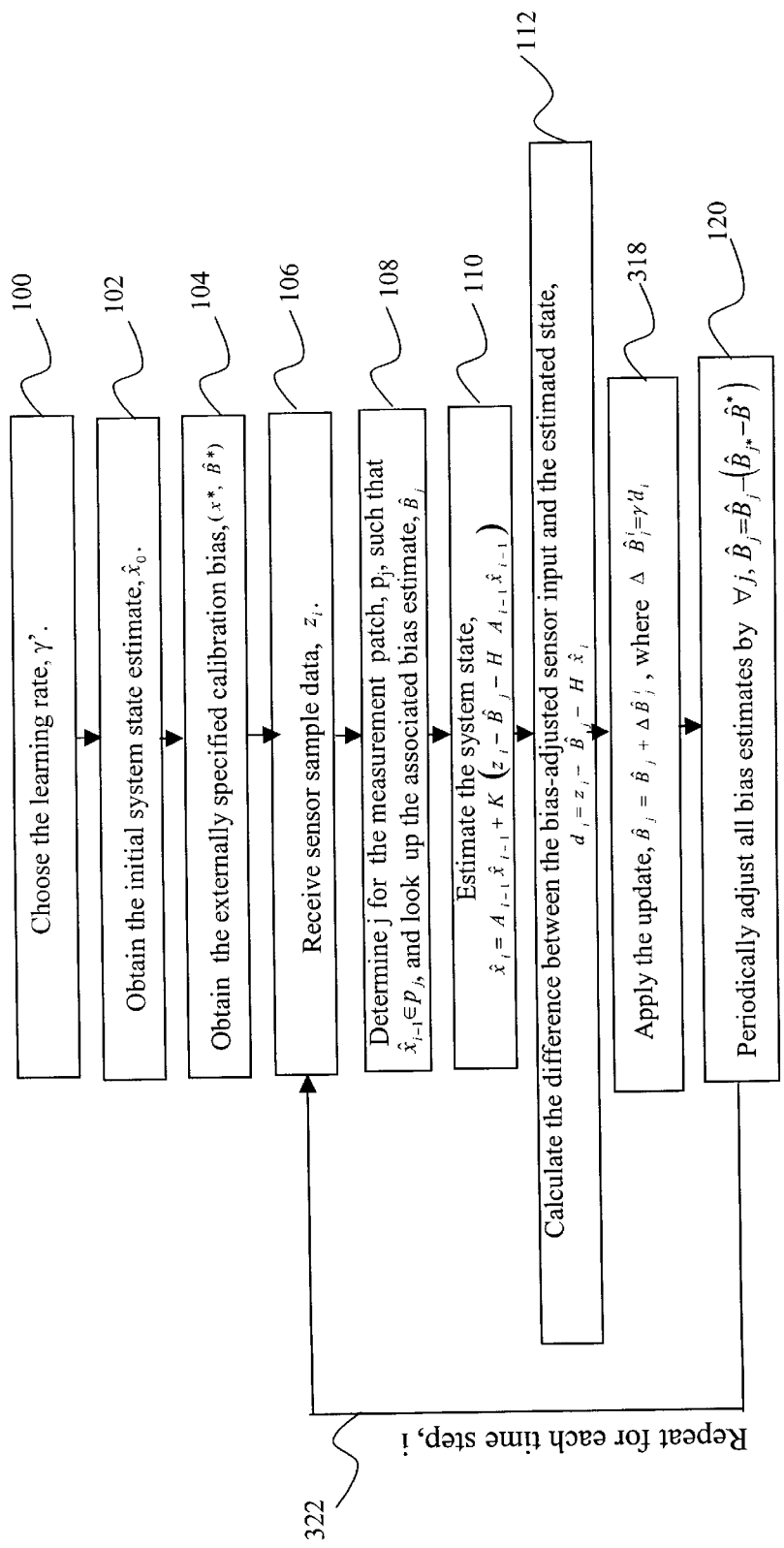
FIG. 3 is a flowchart presenting the steps of the present invention in a general embodiment, which utilizes a significantly simplified gradient descent function in the error minimizer.

FIG. 3 provides a flow chart of the present invention incorporating the simplification process just described. Note that steps 100, 102, 104, 106, 108, 110, 112, and 120 are the same as were shown in FIG. 1. The main difference in FIG. 3 lies in the 318, which represents the simplification above and is equivalent to the Equation (9). After the update has been applied to the bias table, the routine begins again with the receipt of new sensor sample data, $z_i$, as represented by the arrow 322 between box 120 and 106.

Figure 4:
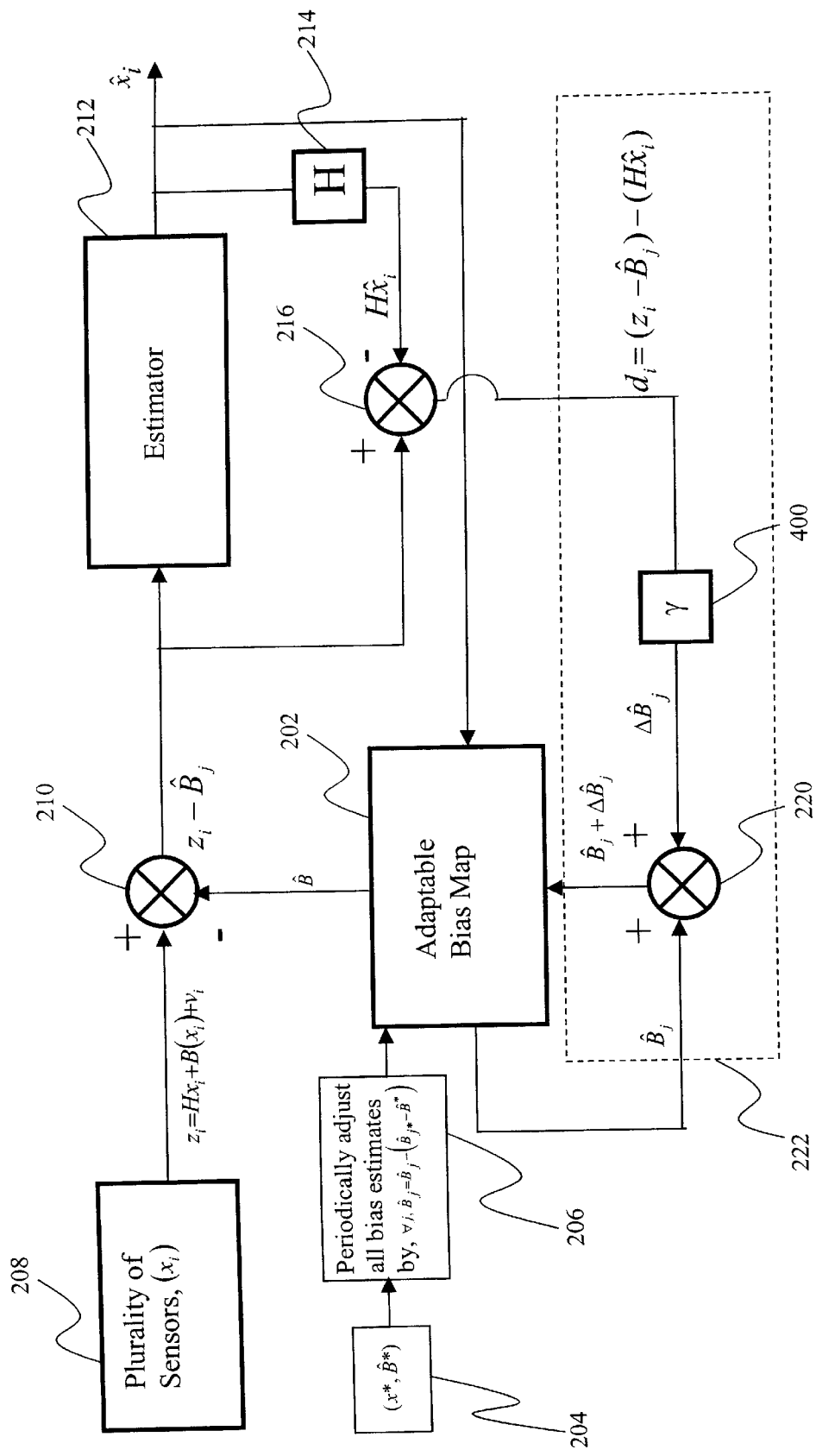
FIG. 4 is a block diagram demonstrating the operation of the present invention in a general embodiment, which utilizes a significantly simplified gradient descent function in the error minimizer.

FIG. 4 provides block diagram of the dynamic auto-calibration estimated bias determination method, incorporating the simplification discussed above. This figure is a modified version of FIG. 2, in which elements 202, 204, 206, 208, 210, 212, 214, 216, 220, and 222 remain the same. However, in FIG. 4 the resulting difference, $d_i=(z_i-\hat{B})-(H\hat{x}_i)$, is directly multiplied by the positive learning rate scalar γ 400. Thus, the simplification avoids the need to calculate the computationally complex Jacobian of the resulting difference, $d_i=(z_i-\hat{B})-(H\hat{x}_i)$. Below, an embodiment is described, which has been used to test the validity of the simplification, and to utilize the present invention in its preferred embodiment.

Figure 5:
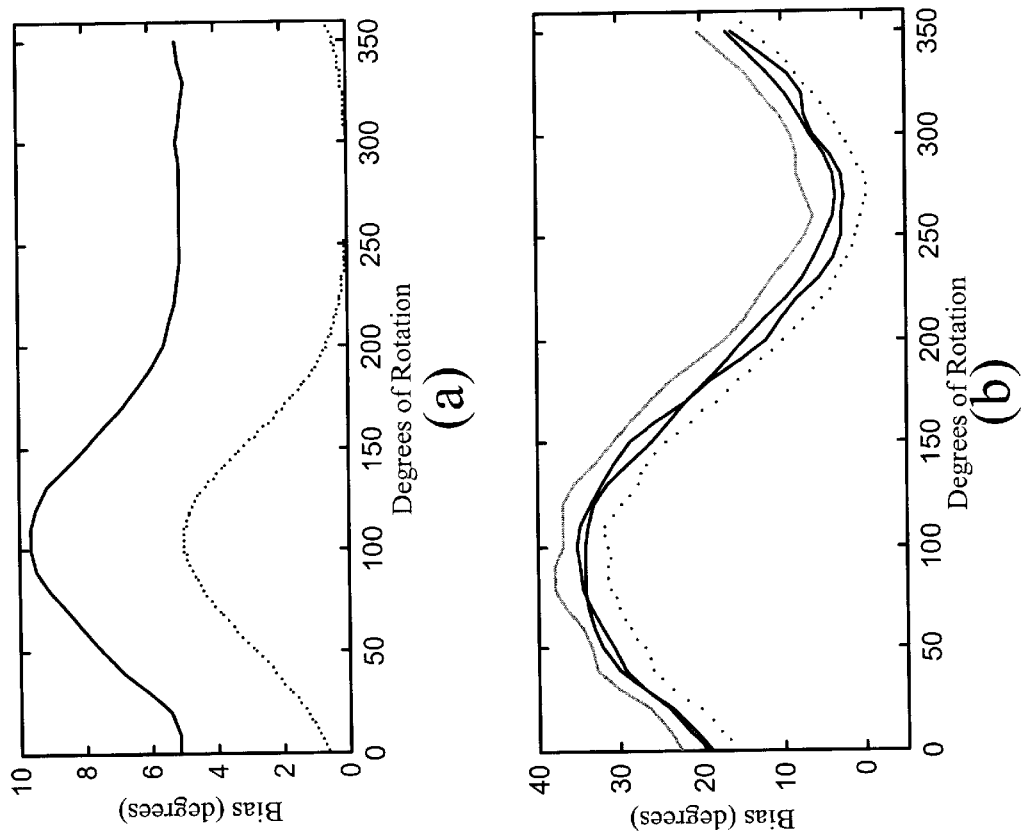
FIG. 5(a) presents results from a head-tracking embodiment in the form of a chart showing the actual and estimated compass bias versus the angle for an artificial bias of five degrees, centered at a heading of 100 degrees.
FIG. 5(b) provides results from a head-tracking embodiment in the form of a demonstration showing the actual and estimated compass bias versus angle for three data sets.

In order to test the validity of the simplification, the invention has been reduced to practice in the context of a head-mounted system that tracks head orientation using a compass, tilt sensor, and three rate gyroscopes. The compass is subject to unpredictable, but persistent distortions due to local magnetic field variations. The invention was applied, to sensor data collected from the head tracking system. It was also run on artificial data generated from a simulation of a distorted compass working in concert with gyroscopes. FIG. 5(a) presents the estimated compass bias versus the angle for an artificial bias of five degrees, centered at a heading of 100 degrees. The dotted line represents the actual bias and the solid line represents the estimated bias. FIG. 5(b) presents the estimated compass bias versus angle for three data sets, with the dotted line showing the bias estimate determined independently of the present invention. The shape of the distortion is accurately estimated, while the overall offset remains to be determined. To eliminate this offset in order to provide an accurate measure of the bias, the single external calibrating input, x*, is utilized. The externally specified calibration bias (x*,$\hat{B}$*) is provided for this purpose.

The implemented system uses inertial navigation to estimate the position of the head. The goal is to estimate the angular position of the head from the input from the compass/tilt sensor suite and the three orthogonally mounted gyroscopes. The compass/tilt sensor suite gives absolute orientation information, with respect to the earth's magnetic and gravitational fields. Two effects impact the compass information: magnetic declination and compass distortion. The magnetic declination adds a constant offset to the compass output. This may be determined either by referring to a magnetic declination map or by reading the compass while sighting a landmark at a known global positioning system (GPS) location, and then using the user-landmark offset to determine the true heading to the landmark. Compass distortion, typically only a few degrees, is a small but significant offset, which may vary with compass heading and with user location. If the mapping of compass heading to heading error followed a systematic and consistent pattern, e.g. simply changed in scale or orientation from day-to-day or from site-to-site, then we would simply create a parameterized corrective map and we would determine the parameters by sighting known landmarks. Such distortion is not systematic or consistent, so creation of a parameterized corrective map is not feasible. Thus, the autocalibration method described herein provides a means for finding the bias map.

For the head tracking system just described, the system state, $x_i$ is six dimensional, consisting of the head's roll (r), pitch (p), and heading (h), in terms of the output of the compass/tilt sensor suite, and the rates of change of roll, pitch, and heading, as measured by the rate gyroscopes. Thus, this six-dimensional vector may be represented as:

$$x_i = [r_c p_c h_c r_g p_g h_g]^T$$

where the subscripts 'C' and 'g' refer to the compass/tilt sensor and gyroscopes, respectively. The system dynamics equation is:

$$x_{i+1} = \begin{bmatrix} I_{3\times 3} & \Delta t\, A_{12i} \\ 0_{3\times 3} & I_{3\times 3} \end{bmatrix} x_i + w_i,$$

where $A_{12i}$ is the 3×3 state transition matrix of derivatives (i.e. the Jacobian of compass/tilt sensor suite values with respect to gyroscopic rotations), and $w_i$ is the noise term, lumping together process noise and acceleratory inputs. Because of the definition of the output of the particular compass/tilt sensor employed in the embodiment, and the orientations of the rate gyroscopes relative to the compass-tilt sensor, $A_{12}$ was determined to be, $$A_{12}(x) = \begin{bmatrix} cpc^2r/a^2 & asrcrsp(t^2r+2/c^2p) & atpc^2r/c^2p \\ 0 & a/cp & -atr \\ 0 & atr/cp & a/c^2p \end{bmatrix},$$

where $$a = \frac{1}{\sqrt{1+t^2p+t^2r}}, \text{ where}$$

s=sin(θ), c=cos(θ), t=tan(θ), and where r, and p are the roll and pitch values in the state x, and Δt is the time step.

Because the state is defined in terms of the sensor outputs, H=I in Equation (2). The matrix of weights K in Equation (3) was chosen to be:

$$K = \begin{bmatrix} g_c I_{3\times 3} & 0_{3\times 3} \\ 0_{3\times 3} & g_g I_{3\times 3} \end{bmatrix}$$

where the values $g_g$=1.0, $g_c$=0.05 were determined empirically. This provides the state estimation procedure, i.e. Equation (3). The bias estimation must still be specified. Because the embodiment is designed only to detect and correct the compass heading bias, the bias estimation is as follows:

$$\hat{B}(x) = (0\ 0\ \hat{B}^H(x)\ 0\ 0\ 0)^T \quad (10)$$

The simplified version of the gradient descent algorithm provided by Equation (9) was used, and γ' was set to 0.05. Data sets used for the testing had on the order of 10,000 sensor inputs, collected at a frequency of 1 KHz. The testing procedure ran each data set 25 times to provide the results shown below. Instead of a simple "look-up table" of values of $\hat{B}_j$, it was desired to generate a function that smoothly interpolated the bias estimate for intermediate angles. As a result, an array of Gaussian fuzzy sets were employed which defined the bias estimate. The resulting general equation for the bias estimate $\hat{B}$ is as follows:

$$\hat{B}(\hat{x}_i) = \sum_{l=0}^{N} W_l e^{-\frac{\|\hat{x}_i - c_l\|^2}{\sigma_W^2}} \quad (11)$$

where N represents the total number of Gaussian fuzzy sets in the bias map, $\sigma_W^2$ defines the widths of the Gaussian fuzzy sets, l is an indexing variable, and $c_l$ defines the center of the lth Gaussian fuzzy set.

For purposes of the present invention, the following assignments were made: $c_l$=10l, σ=20, N=36$\|\hat{x}_i - c_l\|^2 = (\hat{x}_i - 10l)^2$. The resulting bias estimate $\hat{B}$ equation is:

$$\hat{B}(\hat{x}_i) = \sum_{l=0}^{35} W_l e^{-\frac{(x-10l)^2}{\sigma_W^2}}, \sigma_W = 20 \quad (12)$$

thus, an array of 36 Gaussian fuzzy sets was generated, with centers 10 degrees apart and widths of 20 degrees. The use of Gaussian fuzzy sets necessitates a slight modification to the original gradient descent algorithm. This modification will be shown in detail below.

Instead of $$\Delta \hat{B} = -\gamma (\nabla_B E)^T \quad (13)$$

we have $$\Delta W^i = -\gamma' (\nabla_W E)^T \quad (14)$$

where, $\Delta W^i$ is the change in W at time step i, and by the chain rule, equals $$\Delta W^i = -\gamma' \left( \nabla_{\hat{B}} E \frac{\partial \hat{B}}{\partial W} \right)^T \quad (15)$$

or, by substituting Equation (13), $$\Delta W^i = \left( \frac{\partial \hat{B}}{\partial W} \right)^T \Delta \hat{B}^i$$

Next, substituting Equation (9), $$\Delta W^i = -\gamma' \left( \frac{\partial \hat{B}}{\partial W} \right)^T (z_i - \hat{B}^i - H\hat{x}_i) \quad (16)$$

Differentiating Equation (12)

$$\frac{\partial \hat{B}}{\partial W_l} = e^{-\frac{(x-10l)^2}{\sigma_W^2}} \quad (17)$$

Combining Equation (16) and Equation (17) generates the final parameter update formula:

$$\Delta W_l^i = \gamma' (z_i - \hat{B}^i - H\hat{x}_i) e^{-\frac{(\hat{x}_i - 10l)^2}{\sigma_W^2}} \quad (18)$$

The invention was first applied to artificial data with a local compass bias introduced. The data set mimicked a constant horizontal head rotation of 40 degrees per second, for 10 seconds, yielding a sequence of 10,000 sensor data points. As previously discussed for FIG. 5(a), an artificial distortion in the compass input was introduced, which was centered at a heading of 100 degrees, where it had a maximum of 5 degrees of error. As can be seen in the solid line in the same figure, after running through the data set 25 times, the bias estimation captured the actual bias, albeit with a constant offset. This offset was cured by the use of an externally specified calibration bias (x*,$\hat{B}$*). Below, in conjunction with the description of a specific embodiment of the present invention, detail regarding use of the externally specified calibration bias (x*, $\hat{B}$*) to subtract this constant offset from the estimated bias will be provided.

Next, the invention was applied to three real data sets, each of which was collected during horizontal rotation of the head for a duration of about 20 seconds, and yielding about 20,000 samples of sensor input. The data sets were collected in the same session, and at the same physical location, so the compass bias was assumed to be the same. As can be seen in FIG. 5(b), the bias estimation is about the same for each data set. Further, the bias estimate is comparable to that estimated by a separate procedure.

Another measure of the algorithm's performance is the root mean squared discrepancy between sensed and estimated compass heading, i.e. the standard deviation of $d_i$, defined by Equation (6):

$$d_i = z_i - \hat{B}_j - H\hat{x}_i$$

Because of sensor and process noise, this value will never decrease to zero. The table presented in FIG. 6 compares the root mean squared discrepancy, before and after tuning the bias estimate, for all three data sets. The results shown in the table clearly demonstrate that the calibration method of the present invention consistently drives this discrepancy to a small value.

One means for obtaining an externally specified calibration bias (x*, $\hat{B}$*) in the context of the head tracking system described here is to sight a landmark at a known heading, read the compass sensor value, and compute the true compass bias at that heading by subtracting the true heading from the compass output. The measurement patch at the known heading may be termed the landmark measurement patch, $p_j^*$, and the computed compass bias may be termed the true bias $\hat{B}_{j^*} = \hat{B}^*$. Next, the normal gradient descent algorithm is applied, but all bias estimates are periodically adjusted by $$\forall j, \hat{B}_j = \hat{B}_j - (\hat{B}_{j^*} - \hat{B}^*).$$

This adjustment subtracts the constant bias error from the entire bias map.

Another method of adjusting the bias map in the context of the head-tracking embodiment involves the user during use of the system. When the head's estimated orientation is used in an augmented reality system, information is presented on a see-through, heads up display so that it aligns with visible objects in the user's vicinity. The locations on the computer screen at which information is displayed are determined using estimated head orientation. Since the bias-estimation error is constant for all head rotations, all the projected information will appear offset to the left or right by a constant angular displacement. It would be a simple matter to allow the user to control a single scalar input while using the system, e.g. by turning a knob, until the projected information is aligned with the world view. Thus, the system may also be manually aligned.

Figure 7:
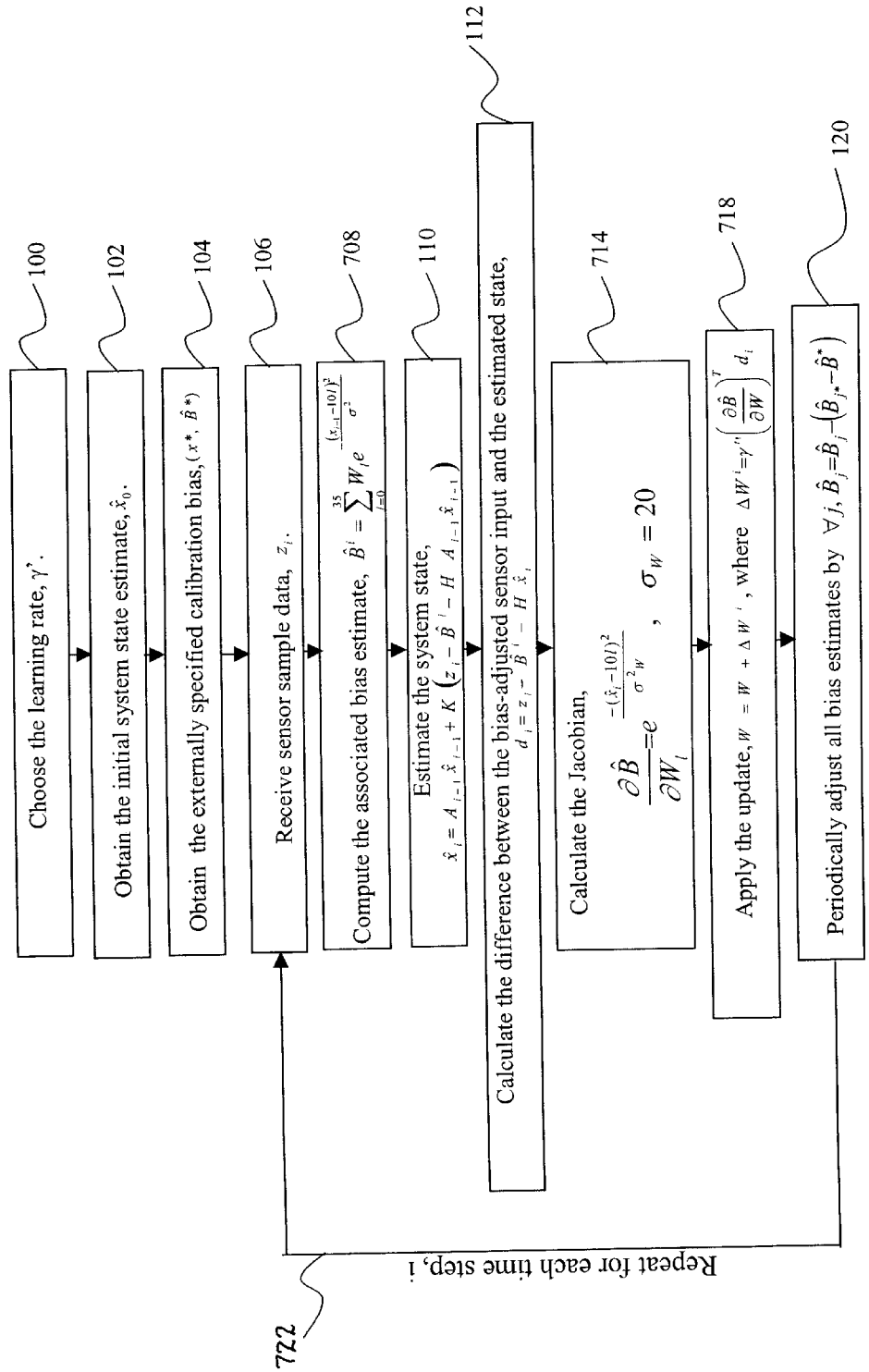
FIG. 7 is a flowchart presenting the steps of the present invention as utilized with Gaussian fuzzy sets to represent the bias map in a head-tracking embodiment.

FIG. 7 provides a flowchart of the head-tracking embodiment of the present invention as a modification of FIG. 1. The steps represented by 100, 102, 104, 106, 110, 112, and 120 all perform the same function as those shown in FIG. 1. The step represented by 708 provides for the computation of the bias estimate $\hat{B}$ as follows:

$$\hat{B}^i = \sum_{l=0}^{35} W_l e^{-\frac{(x_{i-1} - 10l)^2}{\sigma^2}}$$

In this case, the bias is represented in the form of an equation rather than by a look-up table. Thus, the time step i, the patch $p_j$, and the state transition matrix $A_i$, need not be saved.

The step represented by 714 provides the calculation, $$\frac{\partial \hat{B}}{\partial W_l} = e^{-\frac{(x-10l)^2}{\sigma_W^2}}, \quad \sigma_W = 20,$$

also shown by Equation (17) above, where W is defined by Equation (13) and $\sigma_W = 20$ for the particular embodiment. The step represented by 718 provides the update for this embodiment and is equivalent to step 318 of FIG. 3. After the update has been applied to the bias table, the routine begins again with the receipt of sensor data vector $z_i$ 106, as represented by the arrow 722 between box 120 and 106.

Figure 8:
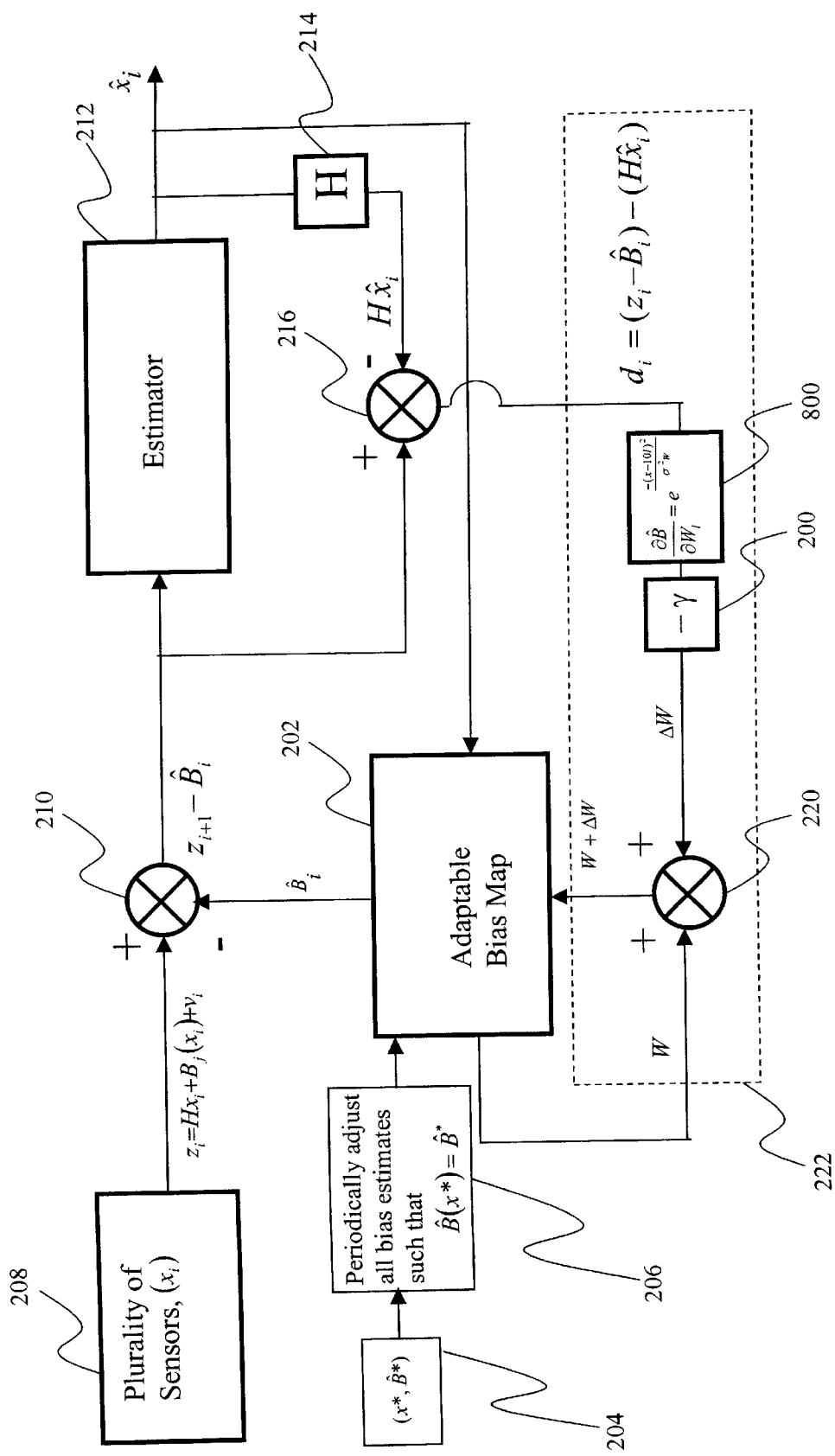
FIG. 8 is a block diagram demonstrating the operation of the present invention as utilized with Gaussian fuzzy sets to represent the bias map in a head-tracking embodiment.

FIG. 8 provides an overview of the dynamic autocalibration estimated bias determination method, representing the head-tracking embodiment discussed above in the form of a block diagram. This figure is a modified version of FIG. 2, in which elements 200, 202, 204, 206, 208, 210, 212, 214, 216, 220, and 222 are essentially unchanged. However, in FIG. 8 the resulting difference, $d_i = (z_i - \hat{B}) - (H\hat{x}_i)$, is multiplied by $$\frac{\partial \hat{B}}{\partial W_l} = e^{-\frac{(x-10l)^2}{\sigma_W^2}},$$

as represented by 800, and as also shown by Equation (17) above, where W as defined for Equation (11) and $\sigma_W = 20$ for the particular embodiment. The product is then multiplied by the learning rate $-\gamma$ 200, and the rest of the figure is analogous to FIG. 2.

Although the present invention has been discussed in the context of a head-tracking system embodiment, there are a wide variety of applications to a wide range of sensors and sensor data. The present invention provides a means to automatically estimate sensor bias, using information readily available from the concurrent sensor fusion/state estimation process. The bias estimation process described herein requires no assumption about the shape of the bias curve. In other words, it is model free. The method is computationally tractable, avoiding storing a long history of state and sensor information, and avoiding large amounts of matrix mathematics. In the head-tracking embodiment previously discussed, the bias is estimated modulo a constant offset, which can be determined by a single external input. This provides a major advantage over existing bias-estimation techniques that require a number of external inputs distributed along the range of possible headings.

What is claimed is:

1. A method for dynamic autocalibration of a multi-sensor tracking system, having a system state $x_i$ within a state space, including the steps of:

a. dividing the state space into a plurality of patches $p_j$;

b. providing a variable bias map including a plurality of bias entries $\hat{B}_j$ with each particular one of the plurality of bias entries $\hat{B}_j$ associated with a particular one of the plurality of patches $p_j$;

c. providing a vector $z_i$ of inputs from a plurality of sensors for a given time step i;

d. determining the patch $p_j$ to which the vector $z_i$ from the plurality of sensors applies;

e. combining the vector $z_i$ with the bias entry $\hat{B}_j$ corresponding to the patch $p_j$ to which the input $z_i$ from the plurality of sensors applies to provide a bias adjusted sensor input;

f. providing a state estimator to receive the bias adjusted sensor input and to produce a system state estimation $\hat{x}_i$ corresponding to the time step i;

g. using a combination of the bias adjusted sensor input and the system state estimation $\hat{x}_i$ to adjust the bias entry $\hat{B}_j$ of the variable bias map corresponding to the patch $p_j$ to which the input $z_i$ from the plurality of sensors applies; and h. repeating steps c through g for each time step i to provide a continual system update.

2. A method for dynamic autocalibration of a multi-sensor tracking system as set forth in claim 1, wherein the bias map includes a constant bias offset, and further including, before step c, the steps of:

a. obtaining a calibration bias pair including an externally specified calibration bias $\hat{B}$ and a corresponding system state calibration value $x^*$; and b. applying the calibration bias pair to the variable bias map to eliminate the constant bias offset.

3. A method for dynamic autocalibration of a multi-sensor tracking system as set forth in claim 2, wherein a learning rate $\gamma'$ is determined prior to the beginning of the repitition of steps c through g, and wherein the adjustment of the variable bias map is performed by means of gradient descent utilizing the learning rate $\gamma'$ and the combination of the bias adjusted sensor input and the system state estimate $\hat{x}_i$.

4. A method for dynamic autocalibration of a multi-sensor tracking system as set forth in claim 3, wherein the next state of the system $x_{i+1}$, corresponding to the next time step i+1, is modeled by $$x_{i+1}=A_i x_i + w_i,$$

where $A_i$ represents a state transition matrix corresponding to the time step i, $x_i$ represents the system state corresponding to the time step i, and $w_i$ represents a noise source where $\overline{w}_i=0$; and wherein the state transition matrix $A_i$, the time step i, and the patch $p_j$ to which it is associated are saved and utilized during the performance of the gradient descent.

5. A method for dynamic autocalibration of a multi-sensor tracking system as set forth in claim 3, wherein the gradient descent is performed parametrically.

6. A method for dynamic autocalibration of a multi-sensor tracking system as set forth in claim 4, wherein the vector $z_i$ from the plurality of sensors depends on the system state $x_i$ corresponding to the time step i by the following relationship, $$z_i = Hx_i + B(x_i) + v_i$$

where H represents a constant matrix for mapping state values onto the system state $x_i$, $B(x_i)$ represents state dependent sensor bias, and $v_i$ represents a noise source where the mean $\overline{v}=0$;

wherein the state estimator provides estimates according to $$\hat{x}_{i+1}=A_i \hat{x}_i + K(z_{i+1} - \hat{B}(A_i \hat{x}_i) - HA_i \hat{x}_i)$$

where $\hat{x}_{i+1}$ is estimate of the system state at time step i+1, K represents a matrix of noise compensation weight values, and $z_{i+1}$ represents the vector from the plurality of sensors at time step i+1;

wherein the gradient descent is performed with the calculation of the Jacobian, $$\frac{\partial d_i}{\partial \hat{B}_j} = H \left( \sum_{\substack{k \le i \text{ s.t.} \\ x_k \in p_j}} \prod_{l=k}^{i-1} (I - KH) A_l \right) K - I,$$

where l is an indexing variable, s.t. is an abbreviation for "such that", where I represents the identity matrix, and where $d_i = (z_i - \hat{B}_j) - (H\hat{x}_i)$; and wherein the bias entries $\hat{B}_j$ are adjusted according to $$\hat{B}_j = \hat{B}_j + \Delta \hat{B}_j^i,$$

where $$\Delta \hat{B}_j^i = -\gamma' d_i^T \frac{\partial d_i}{\partial \hat{B}_j}.$$

7. A method for dynamic autocalibration of a multi-sensor tracking system as set forth in claim 6, wherein the calculation of the Jacobian is simplified into the following relationship, $$\frac{\partial d_i}{\partial \hat{B}_j} = -I,$$

and is used in the adjustment of the bias entries $\hat{B}_j$.

8. A method for dynamic autocalibration of a multi-sensor tracking system including the steps of:
 a. providing a variable bias map parameterized by a plurality of weights;
 b. providing a vector $z_i$ of inputs from a plurality of sensors for a given time step i;
 c. combining the vector $z_i$ with a bias estimate $\hat{B}$ derived from the variable bias map to provide a bias adjusted sensor input;
 d. providing a state estimator to receive the bias adjusted sensor input and to produce a system state estimation $\hat{x}_i$ corresponding to the time step i;
 e. using a combination of the bias adjusted sensor input and the system state estimation $\hat{x}_i$ to adjust the plurality of weights of the variable bias map; and
 f. repeating steps b through e for each time step i to provide a continual system update.

9. A method for dynamic autocalibration of a multi-sensor tracking system as set forth in claim 8, wherein the variable bias map includes a constant bias offset, and further including, before step b, the steps of:
 a. obtaining a calibration bias pair including an externally specified calibration bias $\hat{B}^*$ and a corresponding system state calibration value $x^*$; and
 b. applying the calibration bias pair to the variable bias map to eliminate the constant bias offset.

10. A method for dynamic autocalibration of a multi-sensor tracking system as set forth in claim 9, wherein a learning rate $\gamma'$ is determined prior to the beginning of the repitition of steps c through g, and wherein the adjustment of the variable bias map is performed by means of gradient descent utilizing the learning rate $\gamma'$ and the combination of the bias adjusted sensor input and the system state estimate $\hat{x}_i$.

11. A method for dynamic autocalibration of a multi-sensor tracking system as set forth in claim 10, wherein the variable bias map includes a plurality l of Gaussian fuzzy sets $W_l$, and the bias estimate $\hat{B}$ is defined by $$\hat{B}(\hat{x}_l) = \sum_{l=1}^{N} W_l e^{\frac{-\|\hat{x}_i - c_l\|^2}{\sigma_W^2}}$$

where N represents the total number of Gaussian fuzzy sets $W_l$ in the bias map, $\sigma_W^2$ defines the widths of the Gaussian fuzzy sets $W_l$, l is an indexing variable, and $c_l$ defines the center of the lth Gaussian fuzzy set $W_l$.

12. A method for dynamic autocalibration of a multi-sensor tracking system as set forth in claim 11, wherein $c_l=10l$, $\sigma=20$, N=36, and $\|\hat{x}_i - c_l\|^2 = (\hat{x}_i - 10l)^2$.

13. A method for dynamic autocalibration of a multi-sensor tracking system as set forth in claim 12 wherein the vector $z_i$ of inputs from a plurality of sensors is from a sensor system including at least one gyroscope, at least one compass, and at least one tilt sensor.

14. A dynamic autocalibration system for a multi-sensor tracking system as set forth in claim 13, wherein the at least one gyroscope, at least one compass, and at least one tilt sensor are utilized as part of a head-mounted orientation tracker.

15. A dynamic autocalibration system for a multi-sensor tracking system operating in a system's state space which is divided into a plurality of patches $p_j$, and operative to receive sensor input in the form of a vector $z_i$ from a plurality of sensors where i represents a particular time step, the dynamic autocalibration system including:

a. a variable bias map including a plurality of bias entries $\hat{B}_j$ with each particular one of the plurality of bias entries $\hat{B}_j$ associated with a particular one of the plurality of patches $p_j$, said variable bias map operative to receive a system state estimation $\hat{x}_i$ and to determine an associated patch $p_j$ and the corresponding bias entry $\hat{B}_j$;

b. a first comparator operative to receive the vector $z_i$ from the plurality of sensors and a bias entry $\hat{B}_j$ from the bias map and to subtract the bias entry $\hat{B}_j$ from the vector $z_1$, resulting in the difference $z_i - \hat{B}_j$;

c. a system state estimator operatively connected with the first comparator to receive the difference $z_i - \hat{B}_j$ to provide a system state estimation $\hat{x}_i$ to the bias map;

d. a constant matrix H multiplier including a constant matrix H for mapping state values onto the system state $x_i$, which is connected to receive the system state estimation $\hat{x}_i$ and multiply it by the constant matrix H, resulting in a constant matrix H multiplied system state estimate $H\hat{x}_i$;

e. a second comparator connected to receive the constant matrix H multiplied system state estimate $H\hat{x}_i$ from the constant matrix H multiplier and the difference $z_i - \hat{B}_j$ from the first comparator and to subtract the constant matrix H multiplied system state estimate $H\hat{x}_i$ from the difference $z_i - \hat{B}_j$, resulting in $d_i = (z_i - \hat{B}_j) - (H\hat{x}_i)$;

f. an error minimizer connected to receive $d_i = (z_i - \hat{B}_j) - (H\hat{x}_i)$ from the second comparator and the particular bias entry $\hat{B}_j$ associated with the particular patch $p_j$ to which the current system state estimation $\hat{x}_i$ applies and to adjust the particular bias entry $\hat{B}_j$.

16. A dynamic autocalibration system for a multi-sensor tracking system as set forth in claim 15, wherein the bias map includes a constant bias offset and is operative to receive a calibration bias pair including an externally including an externally specified calibration bias $\hat{B}$ and a corresponding system state calibration value $x^*$, and to utilize calibration bias pair to eliminate the constant bias offset.

17. A dynamic autocalibration system for a multi-sensor tracking system as set forth in claim 16 wherein the error minimizer includes a learning rate $\gamma'$ and adjusts the variable bias map by means of gradient descent, utilizing the learning rate $\gamma'$.

18. A dynamic autocalibration system for a multi-sensor tracking system as set forth in claim 17, wherein the estimator further includes a memory accessible by the error minimizer, and the next state of the system $x_{i+1}$, corresponding to the next time step i+1, is represented by $$x_{i+1} = A_i x_i + w_i,$$

where $A_i$ represents a state transition matrix corresponding to the time step i, $x_i$ represents the system state corresponding to the time step i, and $w_i$ represents a noise source where $\bar{w}_i = 0$; and wherein the state transition matrix $A_i$, the time step i, and the patch $p_j$ to which it is associated are saved in the memory of the estimator and utilized by the error minimizer during the performance of the gradient descent.

19. A dynamic autocalibration system for a multi-sensor tracking system as set forth in claim 17, wherein the gradient descent is performed parametrically.

20. A dynamic autocalibration system for a multi-sensor tracking system as set forth in claim 18, wherein the vector $z_i$ from the plurality of sensors depends on the system state $x_i$ corresponding to the time step i by the following relationship, $$z_i = Hx_i + B(x_i) + v_i$$

where H represents the constant matrix for mapping state values onto the system state $x_i$, $B(x_i)$ represents state dependent sensor bias, and $v_i$ represents a noise source where the mean $\bar{v}_i = 0$;

wherein the estimator provides estimates according to $$\hat{x}_{i+1} = A_i \hat{x}_i + K(z_{i+1} - \hat{B}(A_i \hat{x}_i) - H A_i \hat{x}_i)$$

where $\hat{x}_{i+1}$, is estimate of the system state at time step i+1, K represents a matrix of noise compensation weight values, and $z_{i+1}$, represents the vector from the plurality of sensors at time step i+1;

wherein the error minimizer performs the gradient descent with the calculation of the Jacobian, $$\frac{\partial d_i}{\partial \hat{B}_j} = H \left( \sum_{\substack{k \leq i \text{ s.t.} \\ x_k \in p_j}} \prod_{l=k}^{i-1} (I - KH) A_l \right) K - I,$$

where l is an indexing variable, s.t. is an abbreviation for "such that", and where I represents the identity matrix; and wherein the bias entries $\hat{B}_j$ of the bias table are adjusted according to $$\hat{B}_j = \hat{B}_j + \Delta \hat{B}_j^i,$$

where $$\Delta \hat{B}_j^i = -\gamma' d_i^T \frac{\partial d_i}{\partial \hat{B}_j}.$$

21. A dynamic autocalibration system for a multi-sensor tracking system as set forth in claim 18, wherein the calculation of the Jacobian in the error minimizer is simplified into the following relationship, $$\frac{\partial d_i}{\partial \hat{B}_j} = -I,$$

and is used in the adjustment of the bias entries $\hat{B}_j$.

22. A dynamic autocalibration system for a multi-sensor tracking system operating in a system's state space, and operative to receive sensor input in the form of a vector $z_i$ from a plurality of sensors where i represents a particular time step, the dynamic autocalibration system including:

a. a variable bias map parameterized by a plurality of weights;

b. a first comparator operative to receive the vector $z_i$ from the plurality of sensors and a bias entry $\hat{B}_i$ for the time step i from the bias map and to subtract the bias entry $\hat{B}_i$ from the vector $z_i$, resulting in the difference $z_i - \hat{B}_i$;

c. a system state estimator operatively connected first comparator to receive the difference $z_i - \hat{B}_i$ to provide a system state estimation $\hat{x}_i$ to the bias map;

d. a constant matrix H multiplier including a constant matrix H for mapping state values onto the system state $x_i$, which is connected to receive the system state estimation $\hat{x}_i$ and multiply it by the constant matrix H, resulting in a constant matrix H multiplied system state estimate $H\hat{x}_i$;

e. a second comparator connected to receive the constant matrix H multiplied system state estimate $H\hat{x}_i$ from the constant matrix H multiplier and the difference $z_i-\hat{B}_i$ from the first comparator and to subtract the constant matrix H multiplied system state estimate $H\hat{x}_i$ from the difference $z_i-\hat{B}_i$, resulting in $d_i=(z_i-\hat{B}_i)-(H\hat{x}_i)$;

f. an error minimizer connected to receive $d_i=(z_i-\hat{B}_i)-(H\hat{x}_i)$ from the second comparator and the particular bias entry $\hat{B}_j$ and to adjust the particular bias entry $\hat{B}_j$.

23. A dynamic autocalibration system for a multi-sensor tracking system as set forth in claim 22, wherein the bias map includes a constant bias offset and is operative to receive a calibration bias pair including an externally including an externally specified calibration bias $\hat{B}^*$ and a corresponding system state calibration value $x^*$, and to utilize the calibration bias pair eliminate the constant bias offset.

24. A dynamic autocalibration system for a multi-sensor tracking system as set forth in claim 23 wherein the error minimizer includes a learning rate $\gamma'$ and adjusts the variable bias map by means of gradient descent, utilizing the learning rate $\gamma'$.

25. A dynamic autocalibration system for a multi-sensor tracking system as set forth in claim 24, wherein the variable bias map includes a plurality l of Gaussian fuzzy sets, and the bias estimate $\hat{B}$ is defined by $$\hat{B}(\hat{x}_i) = \sum_{l=0}^{N} W_l e^{\frac{-\|\hat{x}_i - c_l\|^2}{\sigma_W^2}}$$

where N represents the total number of Gaussian fuzzy sets $W_l$ in the bias map, $\sigma_W^2$ defines the widths of the Gaussian fuzzy sets $W_l$, l is an indexing variable, and $c_l$ defines the center of the lth Gaussian fuzzy set $W_l$.

26. A dynamic autocalibration system for a multi-sensor tracking system as set forth in claim 25, wherein $c_l=10l$, $\sigma=20$, N=36, and $\|\hat{x}_i-c_l\|^2=(\hat{x}_i-10l)^2$.

27. A dynamic autocalibration system for a multi-sensor tracking system as set forth in claim 26 wherein the vector $z_i$ of inputs from a plurality of sensors is from a sensor system including at least one gyroscope, at least one compass, and at least one tilt sensor.

28. A dynamic autocalibration system for a multi-sensor tracking system as set forth in claim 27, wherein the at least one gyroscope, at least one compass, and at least one tilt sensor are utilized as part of a head-mounted orientation tracker.

* * * * *